Patented Oct. 12, 1926.

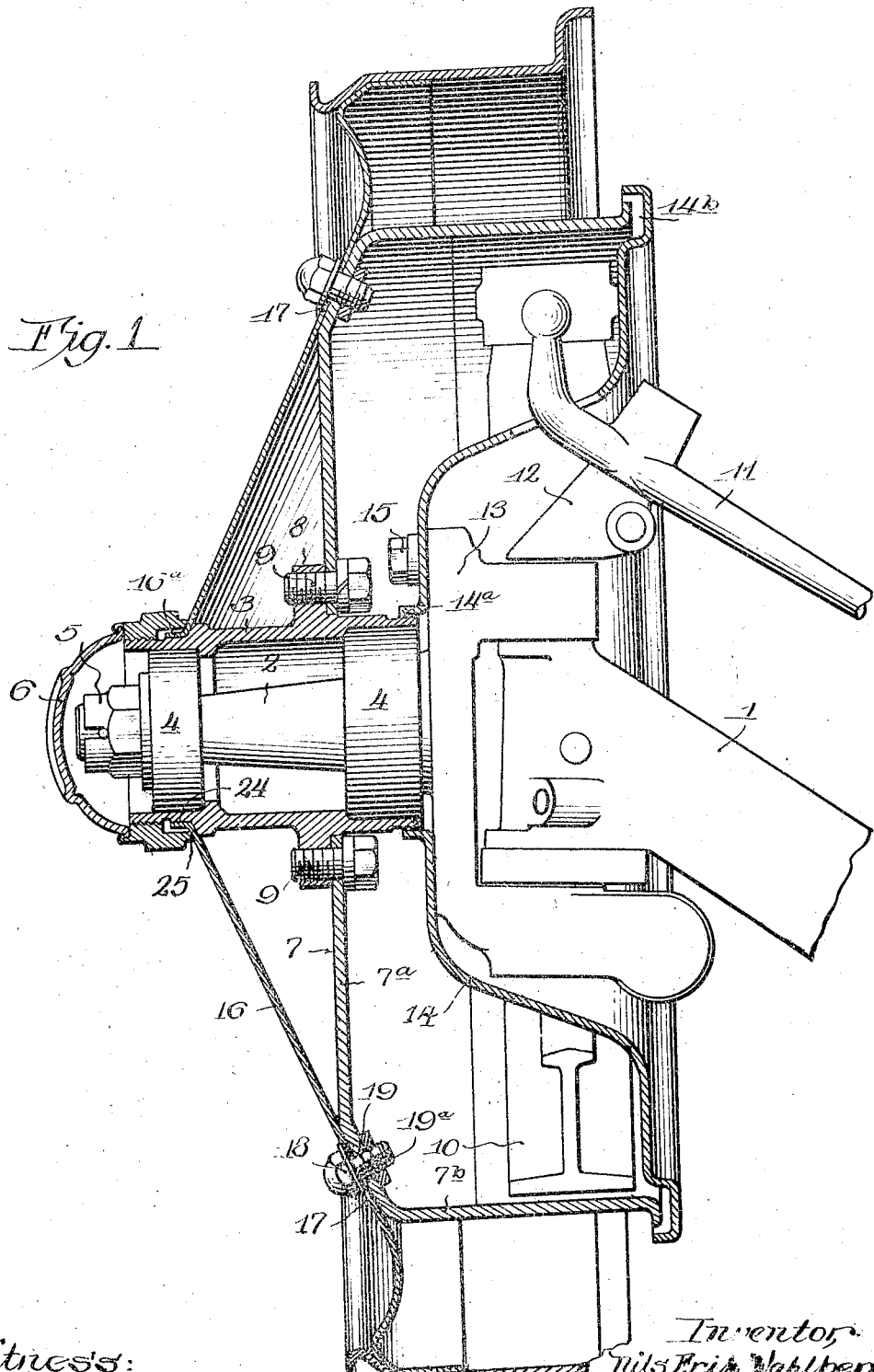

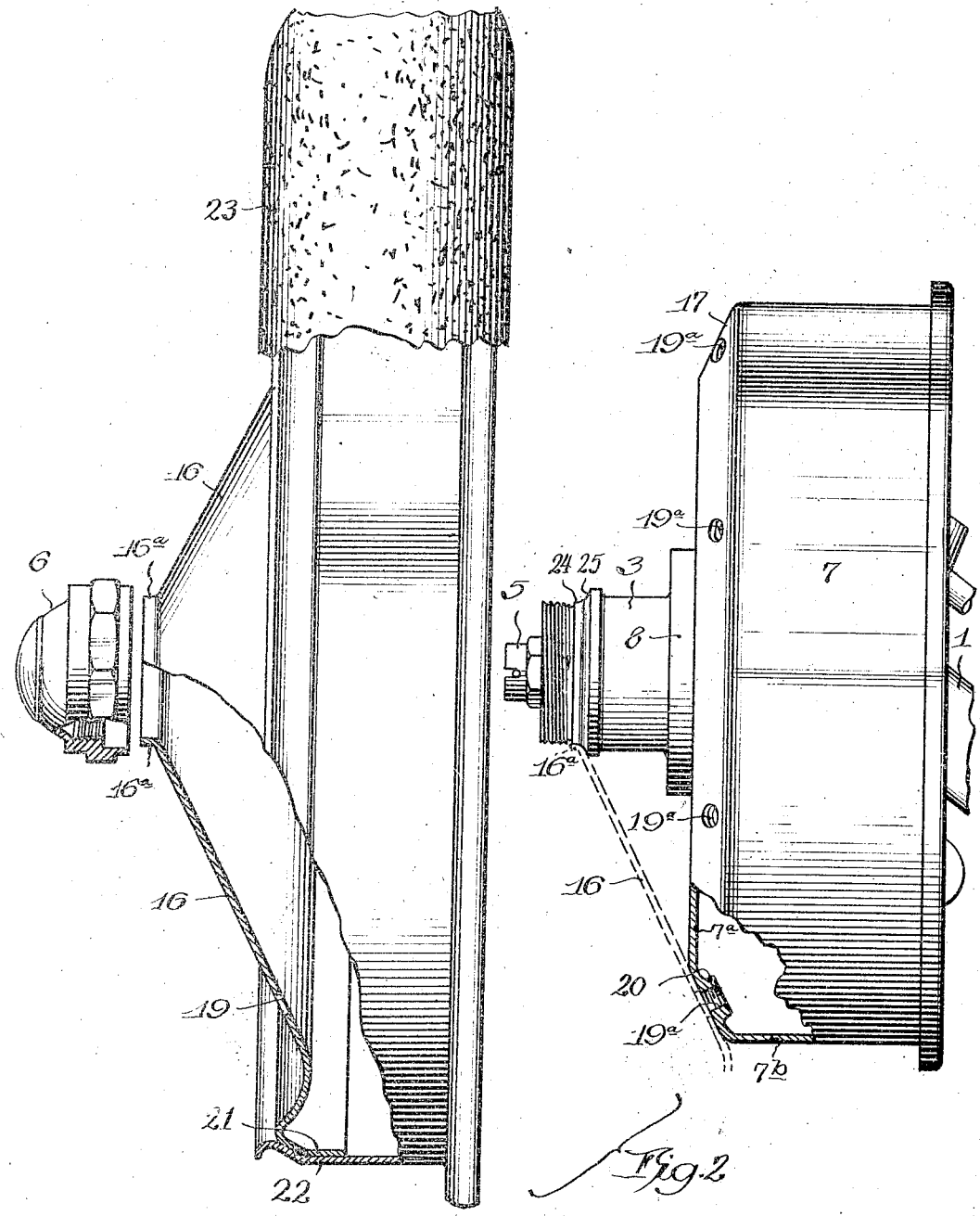

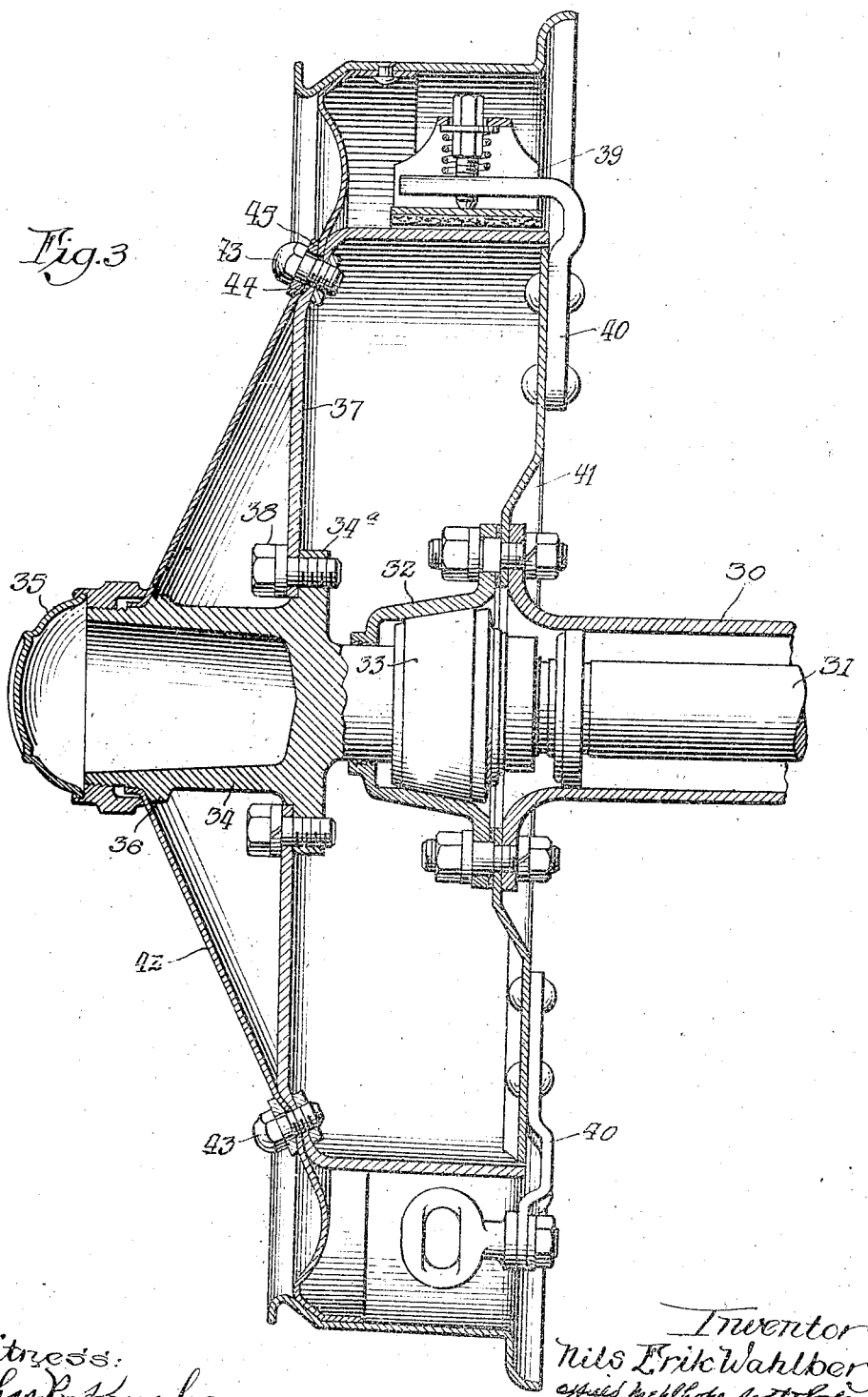

1,602,560

UNITED STATES PATENT OFFICE.

NILS ERIK WAHLBERG, OF KENOSHA, WISCONSIN.

DISK-WHEEL CONSTRUCTION.

Application filed February 16, 1925. Serial No. 9,369.

This invention relates to improvements in disk wheel construction and more particularly to vehicle wheels of the metal disk type.

With the advent of the so-called four wheel brakes for pleasure vehicles, with the additional braking mechanism required, there appears to be considerable room for improvement of the design of vehicle wheels, with a view of reducing their weight to compensate for the added weight of the brake parts carried by each wheel. While a brake mechanism has always been associated with rear wheels, it is readily seen that the additional equipment required to provide the front wheels with brakes, adds materially to the unsprung weight, and thence if this weight is excessive, it follows that the unquestioned advantages of the four wheel brake equipment must necessarily be offset in some degree by the unsprung load factor, which in turn affects the riding qualities and performance of the vehicle.

It is the object of the present invention, therefore, to provide a lighter construction for vehicle wheels and one which contemplates the use of the metal disk type in which the brake drum is incorporated in the wheel structure in such a way as to serve as a vital part of the wheel, as well as a part of the brake mechanism, thus making it possible to eliminate considerable weight and to greatly simplify the design as well as the ease of mounting and demounting.

A preferred embodiment of the invention is disclosed in the accompanying drawings, in which—

Figure 1 is a cross sectional view of the wheel and axle assembly with the tire removed, and Figure 2 is a view in elevation of the wheel with the disk and hub cap demounted, and Figure 3 is a cross sectional view of the rear wheel assembly.

Referring first to the complete front wheel assembly, the same comprises one end portion of the front axle 1, a front wheel spindle 2, the hub 3 journalled on the spindle by means of roller bearings 4, 4, and secured by a nut 5, threaded on the end of the spindle, the end of the hub being surmounted by a hub cap 6.

Mounted on the hub 3, is a brake drum 7, bolted to a radial flange 8 located near the inner end thereof by means of a series of cap screws 9. The brake drum is a pressed steel shell consisting of a radial web $7^a$ and a peripheral flange $7^b$ forming the braking surface and extending inwardly some distance beyond the hub, and enclosing a substantial annular space about the end of the axle. Surrounding the internal face of the brake drum is an expansion type brake band 10, operated by a brake lever 11, pivotally mounted on a suitable bearing 12, carried at the upper end of the spindle yoke 13, and operatively connected at its free end with a brake rod leading to the foot operated brake pedal.

Enclosing the space occupied by the brake band, is an annular disk or plate 14, having its central portion concaved or dish shaped, with a central opening flanged and threaded at $14^a$ to fit the rear end of the hub 3, and further secured in place by means of one or more cap screws 15 anchored in the faces of the spindle yoke against which the central portion of the disk bears. Beyond the central portion the disk extends radially, thence curves rearwardly, and thence radially again, terminating adjacent the inner annular edge of the brake drum in a U-shaped annular recess $14^b$, into which the edge of the brake drum extends, and thus effectively sealing the space between from the entrance of dust and dirt.

The demountable portion of the wheel consists of a shallow conical shaped disk 16, stamped or pressed from relatively light gauge sheet steel, substantially one-half the thickness of the brake drum. As clearly shown in the drawings, an opening is formed at the center of the disk, with a short forwardly extending flange $16^a$ surrounding the opening. From the central opening the disk extends radially at an angle of approximately 60° to the plane of the wheel to and beyond the periphery of the brake drum 8, the latter being beveled at the junction of the radial web $7^a$ and annular flange $7^b$ thereof, to the same angle as the disk, thereby forming an annular bearing face or ring 17 about two inches wide and against which the disk has flush bearing engagement entirely around a circumference between the hub and the rim but somewhat nearer the rim.

Not only has the disk bearing contact with the brake drum at the periphery of the latter, but detachable or demountable connection therewith through the medium of cap screws 18 which pass through a plurality of holes 19, preferably six in number, spaced equidistantly about the annular bearing portion of the disk and corresponding tapped holes 19ª in the beveled edge 17 of the brake drum, the latter being reinforced by small pieces of metal 20, which are welded to the inside of the brake drum, and also tapped. Beyond the brake drum, the disk curves outwardly until just short of its periphery where it is bent inwardly to form the peripheral flange 21, on which is pressed or shrunk the tire rim 22, carrying the pneumatic tire 23. The disk 16 including the rim 22 and tire 23, and the hub cap 6, are the only demountable parts of the wheel, the hub 3 and brake drum 7 remaining securely journalled on the wheel spindle.

The flanged central opening of the disk has a snug fit on an annular bearing surface 24 near the outer end of the hub 3, which is backed up by a shoulder as at 25 beveled at the same angle as the taper of the disk. The hub cap 6 is hollow and somewhat semi-spherical in shape, having a hub engaging ring 26 internally threaded to turn on the threaded end portion of the hub, and a beveled flange 27, extended beyond the threaded portion and bearing edgewise against the disk, just outwardly from the flange 16ª at the edge of the central opening thereof. By screwing the cap tightly down, the hub engaging portion of the disk is securely clamped and locked between the beveled shoulder 25 on the hub, and the beveled edge 24 of the hub cap.

Manifestly to demount the wheel it is only necessary to remove the hub cap 6 and the cap screws 18 and then lift the disk from its seat, as clearly shown in Figure 2. To mount the wheel disk, the reverse operation would be carried out.

The rear wheel construction shown in Figure 3 is not essentially different from the front wheel, the chief departure being the mounting of the wheel on a live axle rather than a dead axle, and in consequence the driving force is transmitted from the axle to the rim, instead of the force being exerted at the rim and transmitted to the axle as in the case of the front wheel.

Thus the rear axle comprises, a tubular axle housing 30, having a propeller shaft 31, journalled therein with its ends extending through and beyond a bearing housing 32, having a flanged end bolted to the flanged end of the axle housing and supporting the outer axle bearing 33. The outer end portion of the propeller shaft is preferably forged into the form of an integral hub 34, with an internal cavity throughout its length, and a short radial flange 34ª at its inner end. Its outer end is threaded to take a hub cap 35, identical with the front hub cap and similarly provided with a shoulder 36, spaced inwardly from the threaded end. The brake drum 37, is bolted to the flange 34ª of the hub, by cap screws 38, and otherwise formed in the same manner as the front brake drum except that the radial flange is not so wide which brings the drum entirely within the width of the wheel rim. An externally contracting brake band 39 is preferably used for the rear wheels, the same being supported by the usual arrangement of brackets 40, riveted to an annular plate 41, supported between the abutting end flanges of the axle housing 30 and bearing housing 32, and lying in the plane of the inner edge of the brake drum.

The disk 42 is of exactly the same construction and design as the front disk, in fact they are interchangeable. Moreover the method of mounting the disk on the hub and fastening it in fixed bearing engagement about the periphery of the brake drum by means of a series of removable cap screws 43, is the same as already described.

A slight modification in the application of these cap screws has been shown, which may be used to some advantage if desired. It will be observed that surrounding the tapped holes in the beveled face of the brake drum are concave seats or depressions as at 44, the screws 43 are provided with loose washers or collars 45, having these outer faces convexed to correspond to the concavity of the seats in the brake drum. In tightening the screws, therefore, the relatively thin metal of the disk is upset between the collars and the concave seats, thereby providing a firmer connection and at the same time obtaining the advantage of a locking action exerted on the screws, due to the resiliency of the metal of the disk. Otherwise the method of mounting and demounting of the rear wheel disk is the same as already described in connection with the front wheel, and the same advantages are present in both.

There are several mechanical and operative advantages of the wheel construction herein disclosed. In the first place, it will be observed that the brake drum, and more particularly the radial web thereof, becomes an essential, if not the main weight supporting part of the wheel structure, in addition to performing its function as the braking surface of the wheel. As a direct result of this design, the construction is not only unified, but a material reduction in the weight of the wheel is accomplished. This may be readily appreciated when it is pointed out that in the ordinary disk wheel the brake drum is merely carried by the wheel and serves only as a part of the brake equipment. Thus by incorporating both in a single unit, not only avoids duplication of unnecessary parts and material, but makes it possible to construct a wheel which weighs no more than the ordinary disk wheel without a brake drum, and, in fact, may be less.

Moreover, the wheel is designed for maximum strength against the multitude of stresses to which a vehicle wheel is subjected. It will be observed from Figure 1, for instance, that a radial section of the wheel reveals a rigid triangular frame structure, formed by the radial web 7ª of the brake drum and the inclined wall of the disk 16, which meet at a fixed point or apex inwardly from the rim of the disk, and with the portion of the hub between the disk and the brake drum forming the base of the frame.

It follows therefore that the wheel stresses are distributed through this rigid triangular or A-frame, with the radial web of the brake drum taking the major portion of the radial stresses on the wheel, transmitting to the axle the road resistance at the rim in the case of the front wheels, and the driving force from the axle to the rim in the case of the rear wheels. Lateral stresses are also resisted by the radial web of the brake drum, assisted by the inclined wall of the disk 16, which acts as a bracing member, from the hub to the periphery of the brake drum. The annular portion of the disk beyond the brake drum, though of relatively light material, is properly designed to afford ample strength against the tortional strains about the rim of the wheel. Hence this construction assures maximum strength and rigidity with minimum of weight. Furthermore, this construction in which the radial web of the brake drum becomes an integral part of the wheel permits the disk to be constructed of a lighter material and provides in effect a light shell which carries the tires and its rim.

Thus as a demountable wheel the structure has exceptional advantages, in that only the relatively light disk is removed, leaving the heavier mass of the wheel supported on the hub, thus simplifying in a large degree the task of changing wheels in case of a puncture or blowout. So, too, the light skeleton disk carried as a spare reduces the extra and needless weight which otherwise is carried by the vehicle.

Having therefore disclosed the wheel construction embodying the invention, and the advantages thereof, I claim as my invention:

1. In a disk wheel construction, the combination of a hub, a brake drum fixed to said hub, and a disk of relatively light gauge metal having rigid demountable connection at its center on said hub and about the periphery of said brake drum.

2. In a disk wheel construction, the combination of a hub, a brake drum fixed at one end of said hub and a disk of relatively thin metal having rigid demountable bearing engagement on the other end of said hub, said disk and brake drum converging radially from said hub and having rigid but demountable connection about the periphery of said brake drum.

3. In a disk wheel construction, the combination of a hub, a brake drum fixed at one end of said hub and comprising a radial web, and a rim supporting disk of relatively light metal having a central bearing at the other end of said hub, said disk and radial web of said brake drum converging radially from said hub and meeting in annular bearing engagement intermediate the center and rim of said disk and threaded fastening members for demountably connecting said disk to said hub and brake drum at its central bearing and adjacent the periphery of the radial web of said brake drum.

4. In a disk wheel construction, the combination of a hub, a brake drum fixed to said hub and a disk of relatively light gauge metal of flat conical section having central bearing engagement with said hub, and annular bearing contact with said brake drum adjacent its periphery, a threaded locking member for rigidly but demountably connecting said disk at its center to said hub at its central bearing, and threaded fastening members extending through said disk and anchored in said brake drum at points about the line of annular bearing engagement therebetween.

Signed at Kenosha, Wis., this 9th day of February, 1925.

NILS ERIK WAHLBERG.